(12) United States Patent
Kiyohara et al.

(10) Patent No.: US 7,278,619 B2
(45) Date of Patent: Oct. 9, 2007

(54) CUP HOLDER DEVICE

(75) Inventors: Kunio Kiyohara, Toyota (JP); Yohei Kuwano, Wako (JP); Kazuaki Horiguchi, Wako (JP); Jun Katakabe, Wako (JP)

(73) Assignees: Nifco Inc., Yokohama. Kanagawa (JP); Honda Motor Co., Ltd., Tokyo (JP)

( * ) Notice: Subject to any disclaimer, the term of this patent is extended or adjusted under 35 U.S.C. 154(b) by 296 days.

(21) Appl. No.: 11/107,857

(22) Filed: Apr. 18, 2005

(65) Prior Publication Data
US 2005/0242606 A1    Nov. 3, 2005

(30) Foreign Application Priority Data
Apr. 21, 2004  (JP)  ............................. 2004-125087

(51) Int. Cl.
*A47K 1/08* (2006.01)
(52) U.S. Cl. ................ 248/311.2; 224/926; 297/188.01
(58) Field of Classification Search ............ 248/311.2, 248/310; 224/926, 281, 282, 275; 297/188.01, 297/144.14, 188.16, 188.17, 188.19
See application file for complete search history.

(56) References Cited
U.S. PATENT DOCUMENTS

| 5,087,008 | A | | 2/1992 | Miller et al. | |
|---|---|---|---|---|---|
| 5,297,767 | A | * | 3/1994 | Miller et al. | ............. 248/311.2 |
| 5,876,007 | A | * | 3/1999 | Lancaster et al. | ........ 248/311.2 |
| 6,450,468 | B1 | | 9/2002 | Hamamoto | |
| 6,464,187 | B1 | | 10/2002 | Bieck et al. | |
| 6,695,271 | B2 | * | 2/2004 | Bieck et al. | ............. 248/311.2 |
| 6,923,517 | B2 | * | 8/2005 | Yamamoto | ................... 312/332 |

FOREIGN PATENT DOCUMENTS

| JP | H02-115734 | 9/1990 |
|---|---|---|
| JP | 2003-325255 | 11/2003 |
| JP | 2004-175168 | 6/2004 |

\* cited by examiner

*Primary Examiner*—Ramon O Ramirez
(74) *Attorney, Agent, or Firm*—Manabu Kanesaka

(57) ABSTRACT

A cup holder device includes a fixed case, a movable case capable of moving between a stored position stored in the fixed body and a drawn-out position projecting forward from an opening of the fixed body, and a cup holder capable of moving between a stored position stored in the movable case and a use position projecting forward from an opening of the movable case. A coupling member is provided on the movable case and pivotally supported such that a projection at one end engages the cup holder in the stored position and a claw at the other end engages the fixed case in the drawn-out position. The coupling member is normally urged toward the fixed case.

9 Claims, 2 Drawing Sheets

CUP HOLDER DEVICE

BACKGROUND OF INVENTION AND RELATED ART STATEMENT

The present invention relates to a cup holder device, and in particular, relates to a cup holder device disposed in an instrument panel, center console, or the like of an automobile, and capable of being drawn out in use.

A cup holder device capable of being drawn out is often provided in an instrument panel, a center console, or the like of an automobile. In such a cup holder device, it is preferable that the cup holder projects greatly from a panel surface in use, and is installed in a small space as possible. A known cup holder comprises a fixed case fixed to an instrument panel or the like, a slide case slidably fitted into the fixed case, and a cup holder slidably fitted into the slide case, and is constituted to be capable of being drawn out in two stages (see Patent Document 1).

In such a cup holder device capable of being drawn out in two stages, a known holder device has a lock mechanism provided on the first stage and the second stage, respectively. An operating load of the two lock mechanisms is different to set an order of an operation in the first stage and the second stage (see Patent Document 2).

Patent Document 1: Japanese Utility Model Publication (Kokai) No. 02-115734

Patent Document 2: Japanese Patent Publication (Kokai) No. 2003-325255

In the cup holder device disposed in Patent Document 2, it is necessary to provide the lock mechanism for each of the first stage and the second stage. Accordingly, the structure becomes complicated, and the number of parts increases.

In view of the problems described above, an object of the present invention is to provide a two-stage type cup holder device with a simple structure and a small number of parts.

Further objects and advantages of the invention will be apparent from the following description of the invention.

SUMMARY OF THE INVENTION

In order to attain the objects described above, according to a first aspect of the present invention, a cup holder device (1) includes a fixed body (fixed case 2), a movable body (movable case 3) capable of moving between a stored position stored in the fixed body and a drawn-out position projecting forward from an opening of the fixed body, and a holding body (cup holder 4) capable of moving between a stored position stored in the movable body and a use position projecting forward from an opening of the movable body. A coupling member (8) is provided on the movable body and pivotally supported to be capable of swaying such that one end thereof (projection 12) engages the holding body in the stored position and the other end thereof (hook 10) engages the fixed body in the drawn-out position, and is normally urged toward the fixed body.

In drawing out, the coupling member engages the holding body, so that the movable body and the holding body move as one body to the drawn-out position. When the movable body and the holding body reach the drawn-out position, the coupling member engages the fixed body and is disengaged from the holding body, so that the holding body moves to the use position. In storing, the coupling member engages the fixed body, so that the movable body and the fixed body become as one body, thereby allowing the holding body to move to the stored position in the movable body. When the holding body reaches the stored position in the movable body, the coupling member is disengaged from the fixed body and engages the holding body, so that the movable body and the holding body move as one body to the stored position in the fixed body.

According to a second aspect of the present invention, the opening of the fixed body faces diagonally downwardly. The movable body moves on a straight line (straight guide groove 5) relative to the fixed body. The holding body moves on an arc (arc-shaped guide groove 7) relative to the movable body.

In the first aspect of the present invention, the coupling member is capable of swaying in a see-saw manner. The other end does not engage the fixed body when the one end engages the movable body, and the one end does not engage the movable body when the other end engages the fixed body. Accordingly, it is possible to selectively engage and disengage the first stage and the second stage with the single mechanism, thereby making a structure of the two-stage type cup holder simple and reducing the number of parts. In the second aspect, a cup placement surface becomes horizontal even when drawn out diagonally. Accordingly, it is possible to install the cup holder device in an inclined state, thereby reducing an installation space.

DETAILED DESCRIPTION OF THE PREFERRED EMBODIMENTS

Hereunder, embodiments of the present invention will be explained in detail with reference to the accompanying drawings.

Figure 1:
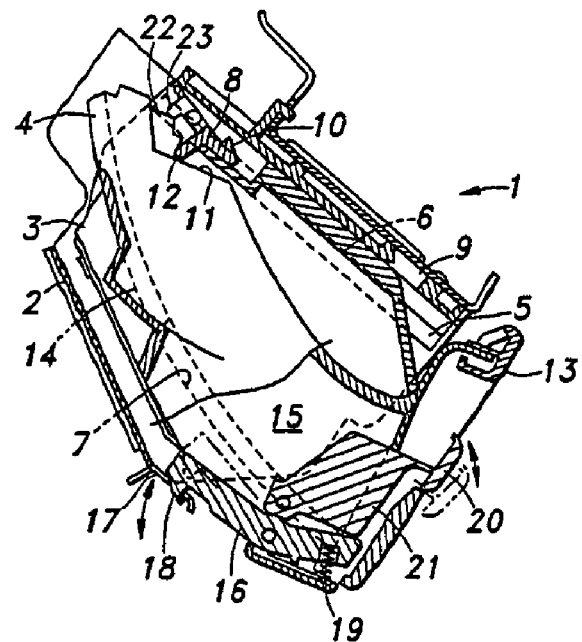
FIG. 1 is a partial sectional side view showing a cup holder device in a fully stored state according to an embodiment of the present invention.
Figure 2:
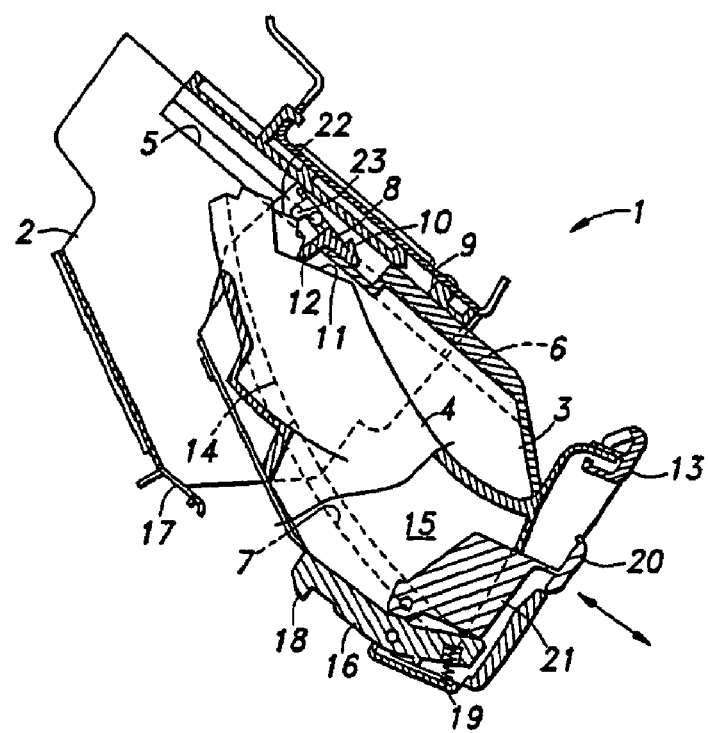
FIG. 2 is a partial sectional side view showing a cup holder device in a course of being drawn out according to the embodiment of the present invention.
Figure 3:
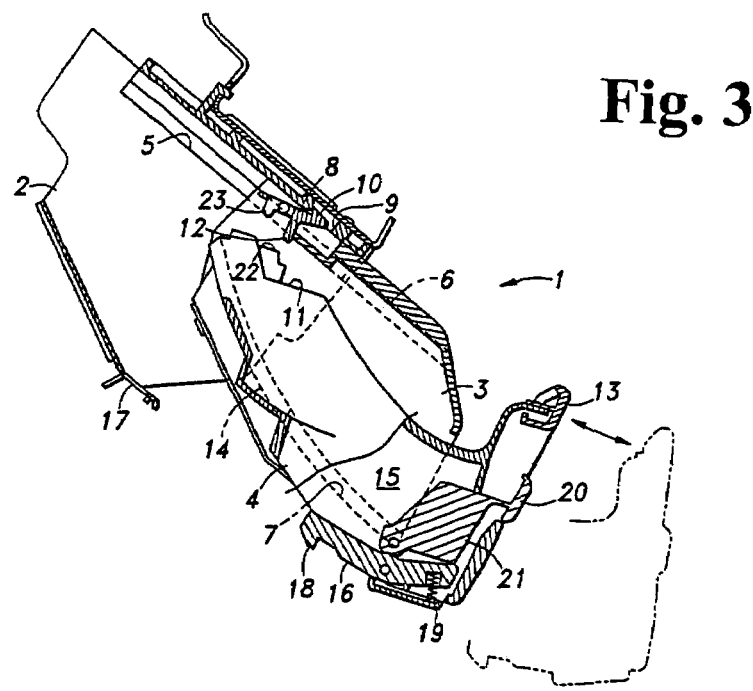
FIG. 3 is a partial sectional side view showing a cup holder device in a state that a first stage is fully drawn out and a second stage is about to be drawn out according to the embodiment of the present invention.

FIGS. 1 to 3 show a cup holder device according to an embodiment of the present invention. FIG. 1 shows a fully stored state, FIG. 2 shows a state in which a first stage is in a course of being drawn out, and FIG. 3 shows a state in which the first stage is fully drawn out and a second stage is about to be drawn out. The cup holder device 1 comprises a fixed case 2 fixed, for example, inside a center console; a movable case 3 fitted in the fixed case 2; and a cup holder 4 fitted in the movable case 3.

The fixed case 2 is made of a metal plate with a bending process, and is shaped generally in a square cylinder with an open surface facing diagonally downwardly in an installed state. A straight guide groove 5 inclined at generally 45 degrees relative to a horizontal line is provided in an inner surface of a side wall of the fixed case 2.

The movable case 3 is formed in a square cylinder shape having a generally similar shape as that of the fixed case 2 by injection molding of a synthetic resin material. A straight line projection 6 is formed on an outer surface of a side wall of the movable case 3 for engaging the straight guide groove 5 of the fixed case 2. The movable case 3 is capable of moving between a position stored inside the fixed case 2 and a position projecting out from the opening of the fixed case 2. An arc-shaped guide groove 7 having a diagonal convex relative to a left side in the drawing is formed in the inner surface of the side wall of the movable case 3. A coupling member 8 is pivotally supported on a rear end side of a top wall of the movable case 3 for selectively engaging the movable case 3 with the fixed case 2 or the cup holder 4.

The coupling member 8 is pivotally supported at a center and sways in a see-saw manner. A torsion coil spring (not shown) wound around a pivot axis urges the coupling member 8 to rotate counterclockwise. A hook 10 is formed on a front end of the coupling member 8 for fitting into a hole 9 provided in a front side of the top wall of the fixed case 2 in a drawn out position from the fixed case 2. A projection 12 is formed on a lower surface of the coupling member 8 at a center for engaging a coupling recess 11 provided in an upper rear end side of the cup holder 4.

The cup holder 4 is formed of a synthetic resin material by injection molding. A cover 13 is integrally formed on a front surface of the cup holder 4 for closing the openings of the fixed case 2 and the movable case 3. An arc-shaped projection 14 is formed on an outer surface of the cup holder 4 at each side thereof for engaging the arc-shaped guide groove 7 in the inner surface of the side wall of the movable case 3. A holding part 15 is formed inside the cover 13 for holding a beverage container in a perpendicular state when drawn out. A lock member 16 swaying in a see-saw manner is pivotally supported on a lower surface of a bottom wall of the holding part 15 becoming horizontal when drawn out.

A coupling hook 18 is formed on a rear end of the lock member 16 for inserting into a hole 17 provided in the front end side of the bottom wall of the fixed case 2. A coil spring 19 is placed on a front end of the lock member 16 for urging the front end upwardly, i.e., urging a rear end downwardly. An action point of a lock release lever 21 having a knob 20 exposed on the front surface of the cover 13 as a force point contacts the upper surface on the front end side of the lock member 16.

An operation of the cup holding device according to the embodiment of the present invention will be explained next.

In an unused state, as shown in FIG. 1, the holder 4 is stored inside the movable case 3, and the movable case 3 storing the cup holder 4 is stored inside the fixed case 2. The cover 13 on the front surface of the cup holder 4 closes the openings of the movable case 3 and the fixed case 2. The coupling member 8 pivotally supported on the movable case 3 tilts front down with the projection 12 abutting against the coupling recess 11 on the rear end part of the cup holder 4. The hook 18 of the lock member 16 of the cup holder 4 engages the hole 17 in the front end of the bottom wall of the fixed case 2, thereby maintaining the fully stored state.

When the cover 13 is drawn forward from this state while pushing down the knob 20 of the lock release lever 21 to disengage the coupling hook 18 of the lock member 16 from the hole 17 in the front end of the bottom wall of the fixed case 2, because the projection 12 of the coupling member 8 pivotally supported on the movable case 3 engages the coupling recess 11 of the cup holder 4, the movable case 3 is drawn out together with the cup holder 4 diagonally downwardly along the straight guide groove 5 in the inner surface of the side wall of the fixed case 2. When the movable case 3 reaches the drawn-out position, the hook 10 of the coupling member 8 is inserted into the hole 9 in the top wall of the fixed case 2, so that the coupling member 8 tilts front up. The projection 12 is disengaged from the coupling recess 11, and the movable case 3 and the cup holder 4 are separated. Accordingly, only the cup holder 4 is drawn out further forward.

Figure 4:
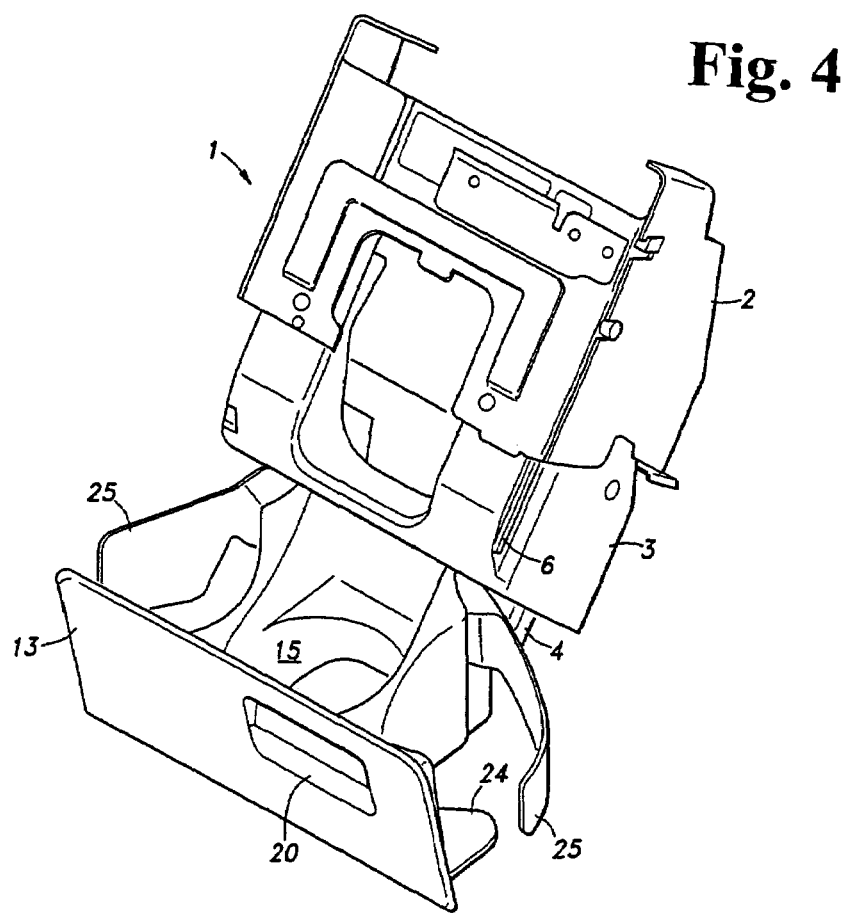
FIG. 4 is a perspective view showing the cup holder device in a use state according to the embodiment of the present invention.

The cup holder 4 is guided by the arc-shaped guide groove 7. Accordingly, when the cover 13 is drawn out diagonally downwardly, the front surface of the cover 13 gradually faces forward. In the drawn-out position, as shown in FIG. 4, a beverage container holding surface 24 integrally formed on the cup holder 4 faces horizontally.

A pair of side holding plates 25 is provided on both side parts of the cup holder 4. The side holding plates 25 are pivotally attached at the rear ends thereof to be capable of swaying left and right, and are normally urged toward the opening direction. The side holding plates 25 are pushed by the side walls of the movable case 3 to close when the cup holder 4 is stored inside the movable case 3. The front ends of the side holding plates 25 open like wings when the cup holder 4 is drawn out from the movable case 3, thereby holding three beverage containers in the holding part 15.

In storing, when the cover 13 of the cup holder 4 is pushed in, reversing the procedure described above, because the hook 10 of the coupling member 8 is inserted into the hole 9 in the top wall of the fixed case 2, only the cup holder 4 is pushed in while maintaining the state in which the movable case 3 is drawn out from the fixed case 2. When a rear end part upper surface 22 of the cup holder 4 collides with a short projection 23 formed on the rear end side of the coupling member 8, the coupling member 8 tilts clockwise and the hook 10 comes out from the hole 9. Accordingly, the movable case 3 is disengaged from the fixed case 2, and subsequently is pushed by the cup holder 4 to be housed inside the fixed case 2. When the cup holder 4 is pushed fully inside the fixed case 2 together with the movable case 3, the hook 18 of the lock member 16 sticks into the hole 17 in the bottom wall of the fixed case 2, thereby maintaining the fully stored state.

As described above, while the movable case 3 and the cup holder 4 are divided in two-stages, through a simple drawing-out operation or pushing-in operation performed on the cup holder 4, the movable case 3 and cup holder 4 are stored inside the fixed case 2 following a predetermined movement order.

The disclosure of Japanese Patent Application No. 2004-125087, filed on Apr. 21, 2004, is incorporated in the application.

While the invention has been explained with reference to the specific embodiments of the invention, the explanation is illustrative and the invention is limited only by the appended claims.

What is claimed is:

1. A cup holder device comprising:
   a fixed body having a first opening,
   a movable body having a second opening and capable of moving between a first stored position stored in the fixed body and a first drawn-out position projecting from the first opening,
   a holding body capable of moving between a second stored position stored in the movable body and a second drawn-out position projecting from the second opening, and
   a coupling member provided on the movable body and having one end engageable with the holding body in the second stored position and the other end engageable with the fixed body in the first drawn-out position so that after the movable body is moved from the first stored position to the first drawn-out position together with the holding body, the other end engages the fixed body to allow the holding body to move from the second stored position to the second drawn-out position.

2. A cup holder device according to claim 1, further comprising a locking member situated between the holding body and the fixed body for locking the holding body to the fixed body when the movable body having the holding body in the second stored position is in the first stored position.

3. A cup holder device according to claim 2, wherein said coupling member is generally urged toward the fixed body.

4. A cup holder device according to claim 2, wherein said coupling member engages the holding body when the movable body is drawn out from the fixed body so that the movable body and the holding body move as one unit to the first drawn-out position.

5. A cup holder device according to claim 4, wherein said coupling member is engaged with the fixed body and disengaged from the holding body when the movable body and the holding body reach the first drawn-out position in a draw-out operation so that the holding body moves from the second stored position to the second drawn-out position.

6. A cup holder device according to claim 5, wherein when the holding body is stored in the movable body, the coupling member engages the fixed body to form the movable body and the fixed body as one unit so that the holding body moves from the second draw-out position to the second stored position.

7. A cup holder device according to claim 6, wherein said coupling member is disengaged from the fixed body and engages the holding body when the holding body reaches the second stored position from the second drawn-out position so that the movable body and the holding body move as one unit to the first stored position.

8. A cup holder device according to claim 1, wherein said coupling member is pivotally provided on the movable body so that the one end engages the holding body or the other end engages the fixed body.

9. A cup holder device, comprising:

a fixed body having a first opening, a movable body having a second opening and capable of moving between a first stored position stored in the fixed body and a first drawn-out position projecting from the first opening, a holding body capable of moving between a second stored position stored in the movable body and a second drawn-out position projecting from the second opening, and a coupling member provided on the movable body and having one end engageable with the holding body in the second stored position and the other end engageable with the fixed body in the first drawn-out position so that after the movable body is moved from the first stored position to the first drawn-out position together with the holding body, the other end engages the fixed body to allow the holding body to move from the second stored position to the second drawn-out position, wherein said opening of the fixed body faces diagonally downwardly, said movable body moving linearly relative to the fixed body, and said holding body moving on an arc relative to the movable body.

* * * * *